United States Patent
Pfeifer et al.

(10) Patent No.: US 9,573,215 B2
(45) Date of Patent: Feb. 21, 2017

(54) SOUND-BASED WELD TRAVEL SPEED SENSING SYSTEM AND METHOD

(71) Applicant: Illinois Tool Works Inc., Glenview, IL (US)

(72) Inventors: Kyle Andrew Pfeifer, Appleton, WI (US); William Joshua Becker, Manitowoc, WI (US); William Todd Watson, Mount Prospect, IL (US); Richard Martin Hutchison, Iola, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 767 days.

(21) Appl. No.: 13/738,770

(22) Filed: Jan. 10, 2013

(65) Prior Publication Data

US 2013/0208569 A1   Aug. 15, 2013

Related U.S. Application Data

(60) Provisional application No. 61/597,556, filed on Feb. 10, 2012.

(51) Int. Cl.
  *B23K 9/095* (2006.01)
  *G01P 3/36* (2006.01)
  *G01P 3/38* (2006.01)
  *G01S 11/14* (2006.01)

(52) U.S. Cl.
  CPC .......... *B23K 9/0956* (2013.01); *B23K 9/095* (2013.01); *G01P 3/36* (2013.01); *G01P 3/38* (2013.01); *G01S 11/14* (2013.01)

(58) Field of Classification Search
  CPC .......... G09B 19/24; G09B 25/02; G09B 5/02; G06G 7/48; H04N 13/0048
  USPC ........................................... 367/129
  See application file for complete search history.

(56) References Cited

U.S. PATENT DOCUMENTS

| | | |
|---|---|---|
| 4,399,346 A | 8/1983 | Kearney et al. |
| 4,532,405 A | 7/1985 | Corby, Jr. et al. |
| 4,581,518 A | 4/1986 | Takahashi et al. |
| 4,711,986 A | 12/1987 | Lillquist et al. |
| 7,962,967 B2 | 6/2011 | Becker et al. |
| 8,274,013 B2 | 9/2012 | Wallace |
| 8,316,462 B2 | 11/2012 | Becker et al. |
| 2007/0164006 A1 | 7/2007 | Burgstaller et al. |
| 2008/0038702 A1 | 2/2008 | Choquet |

(Continued)

FOREIGN PATENT DOCUMENTS

| | | | |
|---|---|---|---|
| EP | 2022592 A | 2/2009 | |
| GB | 1430824 | * 4/1973 | ............... G05F 1/02 |

(Continued)

OTHER PUBLICATIONS

PCT International Search Report for PCT Application No. PCT/US2013/025071 mailed Jun. 7, 2013, 13 pgs.

(Continued)

*Primary Examiner* — Luke Ratcliffe
(74) *Attorney, Agent, or Firm* — Fletcher Yoder P.C.

(57) ABSTRACT

A weld travel speed sensing system includes at least one sound sensor configured to sense a sound generated to allow determination of a position of a welding torch. The weld travel speed sensing system is configured to determine a position of a point on the welding torch based on the sensed sound.

20 Claims, 6 Drawing Sheets

(56) References Cited

U.S. PATENT DOCUMENTS

| | | | |
|---|---|---|---|
| 2008/0314887 A1 | 12/2008 | Stoger et al. | |
| 2009/0231423 A1 | 9/2009 | Becker et al. | |
| 2010/0048273 A1 | 2/2010 | Wallace et al. | |
| 2010/0062405 A1* | 3/2010 | Zboray et al. | 434/234 |
| 2010/0062406 A1 | 3/2010 | Zboray et al. | |
| 2010/0224610 A1* | 9/2010 | Wallace | 219/137 R |
| 2011/0002191 A1* | 1/2011 | DeMaio et al. | 367/1 |
| 2011/0186615 A1 | 8/2011 | Gatlin et al. | |

FOREIGN PATENT DOCUMENTS

| | | |
|---|---|---|
| JP | H09220690 A | 8/1997 |
| JP | 2008110388 A | 5/2008 |
| KR | 100876425 B1 | 12/2008 |

OTHER PUBLICATIONS

PCT International Search Report for PCT Application No. PCT/US2013/025050 mailed Jun. 7, 2013, 16 pgs.

PCT International Search Report for PCT Application No. PCT/US2013/025081 mailed Jun. 7, 2013, 11 pgs.

Cote, Allan et al. (Presenters); Virtual Reality Welder Training; Project Review for ShipTech 2005; Project No. S1051; Mar. 1, 2005; Biloxi MS.

Arc+ Virtual Welding Simulator; 123 Certification Inc.; Feb. 2009; Montreal, Quebec.

VRTEX Virtual Reality Arc Welding Trainer; Lincoln Electric; http://www.lincolnelectric.com/en-us/equipment/training-equipment/Pages/vrtex.aspx; accessed: Apr. 11, 2013.

123arc.com; Products; http://www.123arc.com/en/products.htm; accessed: Apr. 11, 2013.

Fronius International; Product Description—Fronius Virtual Welding; http://www.fronius.com/cps/rde/xchg/SID-99C1850B-518E8F49/fronius_international/hs.xsl/79_15490_ENG_HTML.htm#produkt; accessed: Apr. 11, 2013.

U.S. Appl. No. 13/740,964, filed Jan. 14, 2013, Kyle Andrew Pfeifer.

U.S. Appl. No. 13/755,984, filed Jan. 31, 2013, Kyle Andrew Pfeifer.

* cited by examiner

SOUND-BASED WELD TRAVEL SPEED SENSING SYSTEM AND METHOD

CROSS REFERENCE TO RELATED APPLICATIONS

This application is a Non-Provisional Patent Application of U.S. Patent Application No. 61/597,556, entitled "Weld Travel Speed Sensing Systems and Methods", filed Feb. 10, 2012, which is herein incorporated by reference.

BACKGROUND

The invention relates generally to welding systems, and, more particularly, to sensing systems for monitoring a travel speed of a welding torch during a welding operation.

Welding is a process that has become ubiquitous in various industries for a variety of types of applications. For example, welding is often performed in applications such as shipbuilding, aircraft repair, construction, and so forth. While these welding operations may be automated in certain contexts, there still exists a need for manual welding operations. In some manual welding operations, it may be desirable to monitor weld parameters, such as the travel speed of the welding torch, throughout the welding operation. While the travel speed of an automated torch may be robotically controlled, the travel speed of the welding torch in manual operations may depend on the operator's welding technique and pattern. Unfortunately, it may be difficult to measure this weld motion during a welding operation due to features of the welding environment, operator considerations, and so forth.

BRIEF DESCRIPTION

In a first embodiment, a weld travel speed sensing system includes at least one sound sensor configured to sense a sound generated to allow determination of a position of a welding torch. The weld travel speed sensing system is configured to determine a position of a point on the welding torch based on the sensed sound.

In another embodiment, a weld travel speed sensing system includes at least one sound sensor configured to sense a sound emitted from a welding arc produced by a welding torch. The weld travel speed sensing system is configured to determine a position of the welding arc based on the sensed sound.

In a further embodiment, a method includes determining, via a sound sensor associated with a welding system, a sensor signal indicative of a sound emitted for determination of a position of a welding torch of the welding system. The method also includes determining, via a processing system, a position of a point on the welding torch based at least in part on the sensor signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, provided herein are systems and methods for determining the travel speed of a welding device during a welding operation. The foregoing systems and methods may be used separately or in combination to obtain information during the welding operation relating to the three dimensional position of a point on the welding torch. The change in this position with respect to time may be used to determine the speed of the welding torch along the surface of the metal being welded, and this weld travel speed may be utilized to evaluate the heat input to a welding workpiece at a given time. The monitored position of one or more points on the welding torch may be used to determine other parameters as well, including orientation, travel direction, and velocity of the welding torch. In some embodiments, the methods described herein may be utilized in unconstrained or manual welding operations to offer advantages over traditional systems in which it may be difficult to measure the weld motion. However, the foregoing systems and methods may be utilized in a variety of suitable welding systems, such as automated or robotic systems.

Present embodiments are directed toward systems and methods for sensing a travel speed of a welding torch using a sound-based detection system. More specifically, the disclosed systems include a travel speed sensing system that monitors a sound associated with the welding system via at least one sound sensor, and detects or determines a travel speed of the welding torch based on the monitored sound. In some embodiments, the travel speed sensing system may include an array of sound sensors (e.g., microphones) located throughout a weld area, and the sound sensors detect a sound emitted from the welding torch. The term "array" in the following discussion refers to an arrangement of two or more elements (e.g., sensors, emitters) that may be located in fixed or unfixed positions relative to one another. In other embodiments, a single sound sensor may be disposed on the welding torch, and an array of sound emitting devices may be located throughout the weld area. By monitoring a change in time of flight of one or more emitted sounds to one or more sensors throughout the system, the travel speed sensing system may determine a change in spatial location of the welding torch with respect to time.

Figure 1:
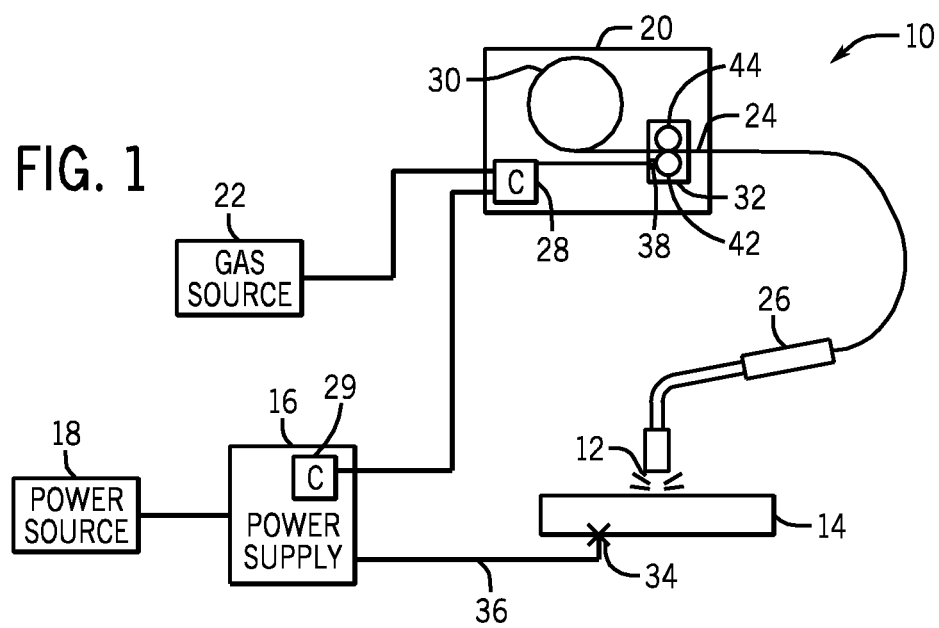
FIG. 1 is a block diagram of an embodiment of a welding system utilizing a welding torch.

Turning now to the figures, FIG. 1 is a block diagram of an embodiment of a welding system 10 in accordance with the present techniques. The welding system 10 is designed to produce a welding arc 12 on a workpiece 14. The welding arc 12 may be of any type of weld, and may be oriented in any desired manner, including MIG, metal active gas (MAG), various waveforms, tandem setup, and so forth. The welding system 10 includes a power supply 16 that will typically be coupled to a power source 18, such as a power grid. Other power sources may, of course, be utilized including generators, engine-driven power packs, and so forth. In the illustrated embodiment, a wire feeder 20 is coupled to a gas source 22 and the power source 18, and supplies welding wire 24 to a welding torch 26. The welding torch 26 is configured to generate the welding arc 12 between the welding torch 26 and the workpiece 14. The welding wire 24 is fed through the welding torch 26 to the welding arc 12, molten by the welding arc 12, and deposited on the workpiece 14.

The wire feeder 20 will typically include control circuitry, illustrated generally by reference numeral 28, which regulates the feed of the welding wire 24 from a spool 30, and commands the output of the power supply 16, among other things. Similarly, the power supply 16 may include control circuitry 29 for controlling certain welding parameters and arc-starting parameters. The spool 30 will contain a length of welding wire 24 that is consumed during the welding operation. The welding wire 24 is advanced by a wire drive assembly 32, typically through the use of an electric motor under control of the control circuitry 28. In addition, the workpiece 14 is coupled to the power supply 16 by a clamp 34 connected to a work cable 36 to complete an electrical circuit when the welding arc 12 is established between the welding torch 26 and the workpiece 14.

Placement of the welding torch 26 at a location proximate to the workpiece 14 allows electrical current, which is provided by the power supply 16 and routed to the welding torch 26, to arc from the welding torch 26 to the workpiece 14. As described above, this arcing completes an electrical circuit that includes the power supply 16, the welding torch 26, the workpiece 14, and the work cable 36. Particularly, in operation, electrical current passes from the power supply 16, to the welding torch 26, to the workpiece 14, which is typically grounded back to the power supply 16. The arcing generates a relatively large amount of heat that causes part of the workpiece 14 and the filler metal of the welding wire 24 to transition to a molten state, thereby forming the weld.

To shield the weld area from being oxidized or contaminated during welding, to enhance arc performance, and to improve the resulting weld, the welding system 10 also feeds an inert shielding gas to the welding torch 26 from the gas source 22. It is worth noting, however, that a variety of shielding materials for protecting the weld location may be employed in addition to, or in place of, the inert shielding gas, including active gases and particulate solids.

Presently disclosed embodiments are directed to a sound-based travel speed sensing system used to detect a change in position of the welding torch 26 over time throughout the welding process. In some embodiments, the travel speed of the welding torch 26 may refer to a change in three dimensional position of the welding torch with respect to time. In other embodiments, the travel speed of the welding torch 26 may refer to a change in two dimensional position of the welding torch 26 within a plane parallel to a welded surface of the workpiece 14. Although FIG. 1 illustrates a gas metal arc welding (GMAW) system, the presently disclosed techniques may be similarly applied across other types of welding systems, including gas tungsten arc welding (GTAW) systems and shielded metal arc welding (SMAW) systems. Accordingly, embodiments of the sound-based travel speed sensing systems may be utilized with welding systems that include the wire feeder 20 and gas source 22 or with systems that do not include a wire feeder and/or a gas source, depending on implementation-specific considerations.

Figure 2:
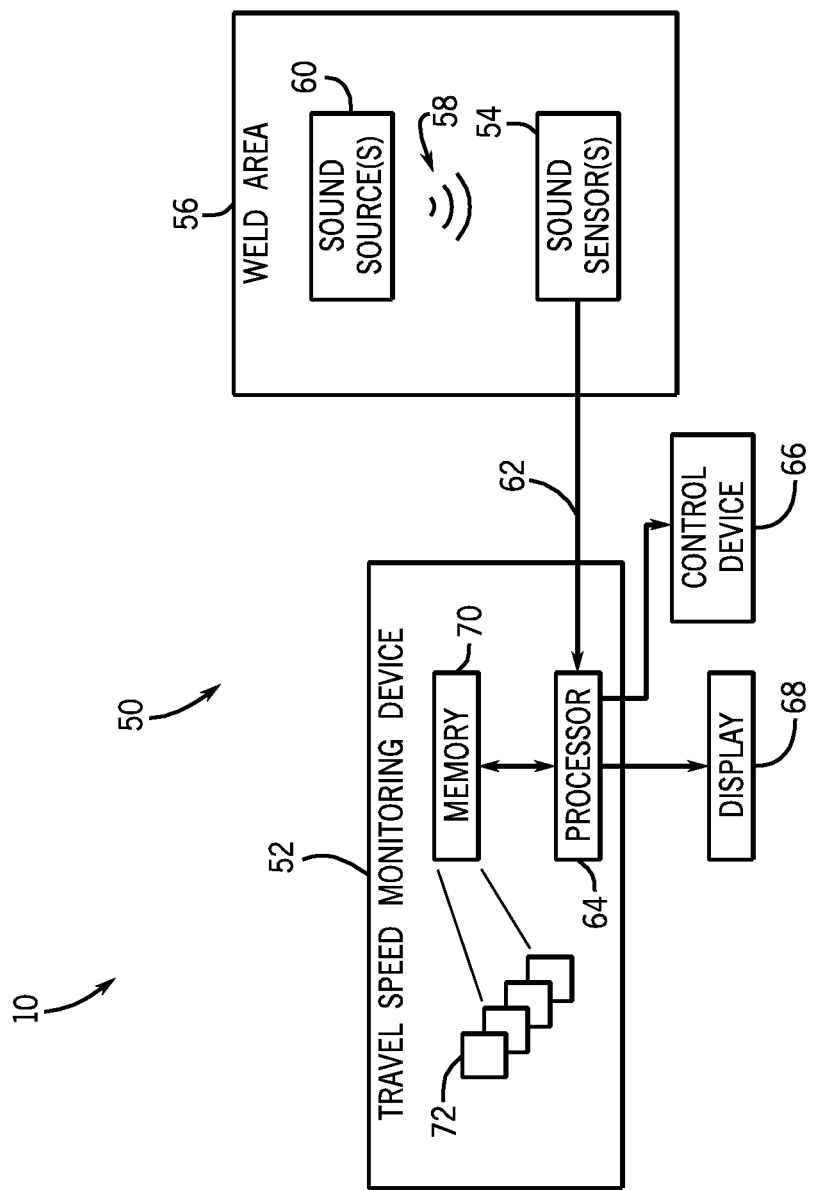
FIG. 2 is a block diagram of an embodiment of the welding system of FIG. 1, including a travel speed sensing system for detecting a travel speed of the welding torch.

FIG. 2 is a block diagram of an embodiment of the welding system 10, including a travel speed sensing system 50 in accordance with presently disclosed techniques. The travel speed sensing system 50 may include, among other things, a travel speed monitoring device 52 configured to process signals received from one or more sound sensors 54 disposed about a weld area 56. The sound sensors 54 may be any desirable type of sensor that converts acoustic energy into an electrical signal. For example, the sound sensors 54 may include any number or arrangement of microphones disposed about the weld area 56. The weld area 56 may include a weld cell within which a welding operator is using the welding system 10 to perform a welding operation. In some embodiments, the weld area 56 may include a surface or structure upon which the workpiece 14 is located throughout the welding process, or the workpiece 14 itself.

The sound sensors 54 may be used to monitor one or more sounds 58 generated to allow determination of a position of the welding torch 26. The sounds 58 may come from one or more sound sources 60 within the weld area 56. For example, the one or more sounds 58 may be emitted from one or more sound emitting devices disposed on the welding torch 26, or from the welding arc 12 produced by the welding torch 26. In other embodiments, the sounds 58 may be emitted from one or more sound emitting devices disposed about the weld area 56 external to the welding torch 26. Each of the sound sensors 54 may convert the acoustic energy of the sound waves 58 incident on the sound sensor 54 into an electrical signal 62. The travel speed sensing system 50 may then transmit the signal 62 to a processor 64 of the travel speed monitoring device 52. In certain embodiments, the one or more sounds 58 associated with the welding system 10 are distinguishable, via the travel speed sensing system 50, from one or more sounds associated with additional welding systems that may be located nearby.

As shown, the travel speed monitoring device 52 may include the processor 64, which receives inputs such as sensor data from the sound sensors 54 via the signal 62. Each signal 62 may be communicated over a communication cable, or wireless communication system, from the one or more sound sensors 54 located throughout the weld area 56. In an embodiment, the processor 64 may also send control commands to a control device 66 of the welding system 10 in order to implement appropriate actions within the welding system 10. For example, the control device 66 may control a welding parameter (e.g., power output, wire feed speed, gas flow, etc.) based on the determined travel speed of the welding torch 26. The processor 64 also may be coupled with a display 68 of the travel speed monitoring device 52, and the display 68 may provide a visual indicator of the travel speed of the welding torch 26 based on the determined travel speed.

Further, the processor 64 is generally coupled to a memory 70, which may include one or more software modules 72 that contain executable instructions, transient data, input/output correlation data, and so forth. The memory 70 may include volatile or non-volatile memory such as magnetic storage memory, optical storage memory, or a combination thereof. Furthermore, the memory 70 may include a variety of machine readable and executable instructions (e.g., computer code) configured to provide a calculation of weld travel speed, given input sound-based sensor data. Generally, the processor 64 receives such sensor data from the one or more sound sensors 54 in the weld area 56, and references data stored in the memory 70 to implement such calculation. In this way, the processor 64 is configured to determine a travel speed of the welding torch 26, based at least in part on the signal 62.

In some embodiments, the travel speed sensing system 50 may be provided as an integral part of the welding system 10 of FIG. 1. That is, the travel speed sensing system 50 may be integrated into a component of the welding system 10, for example, during manufacturing of the welding system 10. For example, the power supply 16 may include appropriate computer code programmed into the software to support the travel speed sensing system 50. However, in other embodiments, the travel speed sensing system 50 may be provided as a retrofit kit that may enable existing welding systems 10 with the sound-based travel speed sensing capabilities described herein. The retrofit kit may include, for example, the travel speed sensing system 50, having the processor 64 and the memory 70, as well as one or more sound sensors 54 from which the travel speed sensing system 50 receives sensor input. In some embodiments, the retrofit kit may also include the welding torch 26, having the sound sensor 54 or sound emitting device installed thereon. To that end, such retrofit kits may be configured as add-ons that may be installed onto existing welding systems 10, providing travel speed sensing capabilities. Further, as the retrofit kits may be installed on existing welding systems 10, they may also be configured to be removable once installed.

Figure 3:
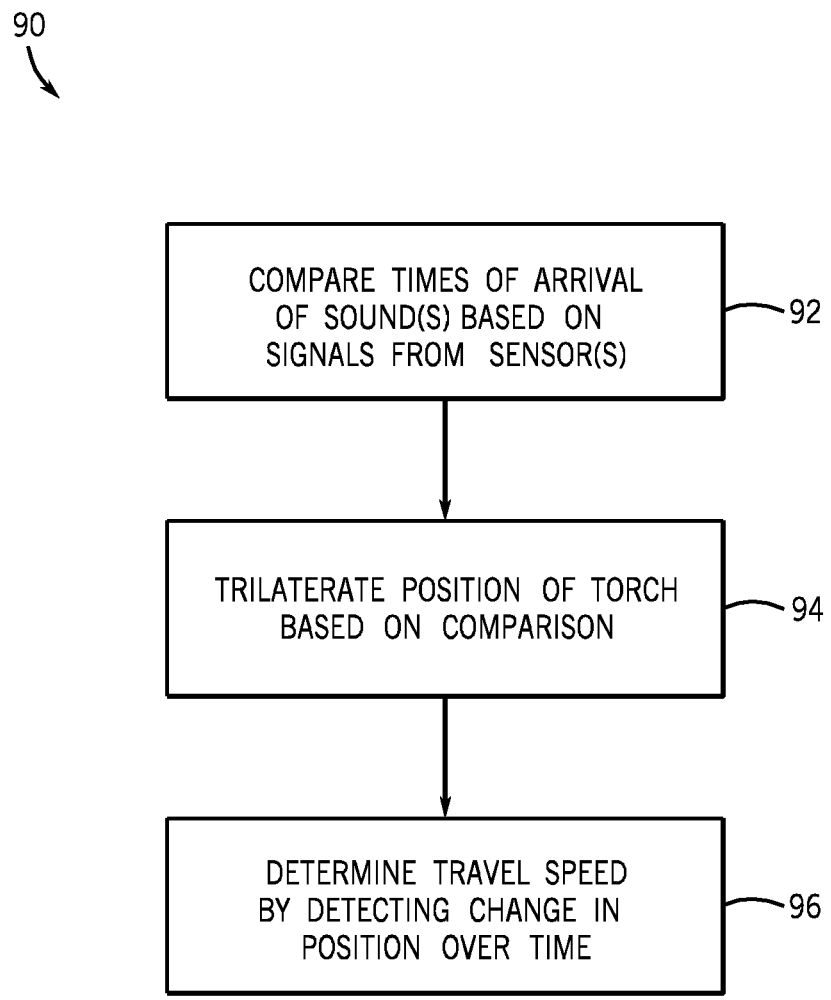
FIG. 3 is a process flow diagram of an embodiment of a method for detecting the travel speed of the welding torch using the travel speed sensing system of FIG. 2.

FIG. 3 is a process flow diagram of an embodiment of a method 90 for detecting the travel speed of the welding torch 26 using the travel speed sensing system 50. The method 90 includes various blocks that may be implemented via the travel speed monitoring device 52. More specifically, the method 90 may be implemented as a computer or software program (e.g., code or instructions) that may be executed by the processor 64 to execute one or more of the steps of the method 90. Additionally, the program (e.g., code or instructions) may be stored in any suitable article of manufacture that includes at least one tangible non-transitory, computer-readable medium that at least collectively stores these instructions or routines, such as the memory 70 or another storage component of the travel speed monitoring device 52. The term non-transitory indicates that the medium is not a signal.

The method 90 includes comparing (block 92) times of arrival of one or more sounds 58 to one or more sound sensors 54 based on the signals 62 from the sound sensors 54. The travel speed monitoring device 52 may perform this comparison by analyzing the signals 62 to detect the times at which an identifiable characteristic of the sound 58 associated with the welding system 10 reaches each sensor 54. In some embodiments, the sound 58 associated with the welding system 10 may be identifiable by the travel speed sensing system 50 based on a pulse, a chirp, a delay, a waveform, a frequency content, a sound wave shape, a pulse pattern, or some combination thereof. Times of arrival may then be compared to determine a relative time of arrival of each sound 58 to each sound sensor 54. The method 90 may include trilateration (block 94) of a position of a point on the welding torch 26 based on the compared time of arrival, or time of flight. Time of flight of the sound waves 58 is proportional to the distance from the sound source 60 to the sound sensor 54. Therefore, it may be possible to determine a three dimensional position of the point on the welding torch 26 based on the relative times of arrival of the sounds 58 to the sound sensors 54.

In addition, the method 90 includes determining (block 96) the travel speed of the welding torch 26 by detecting a change in position of the point on the welding torch 26 with respect to time. This may involve processing signals received from the one or more sound sensors 54 at a regular time interval. The processor 64 may determine a change in the position of the welding torch 26 from signals received at two subsequent times, and divide this change in position by the time interval. Other methods may be utilized to determine the change in position of the welding torch 26 with respect to time, thereby detecting the travel speed of the welding torch 26.

Figure 4:
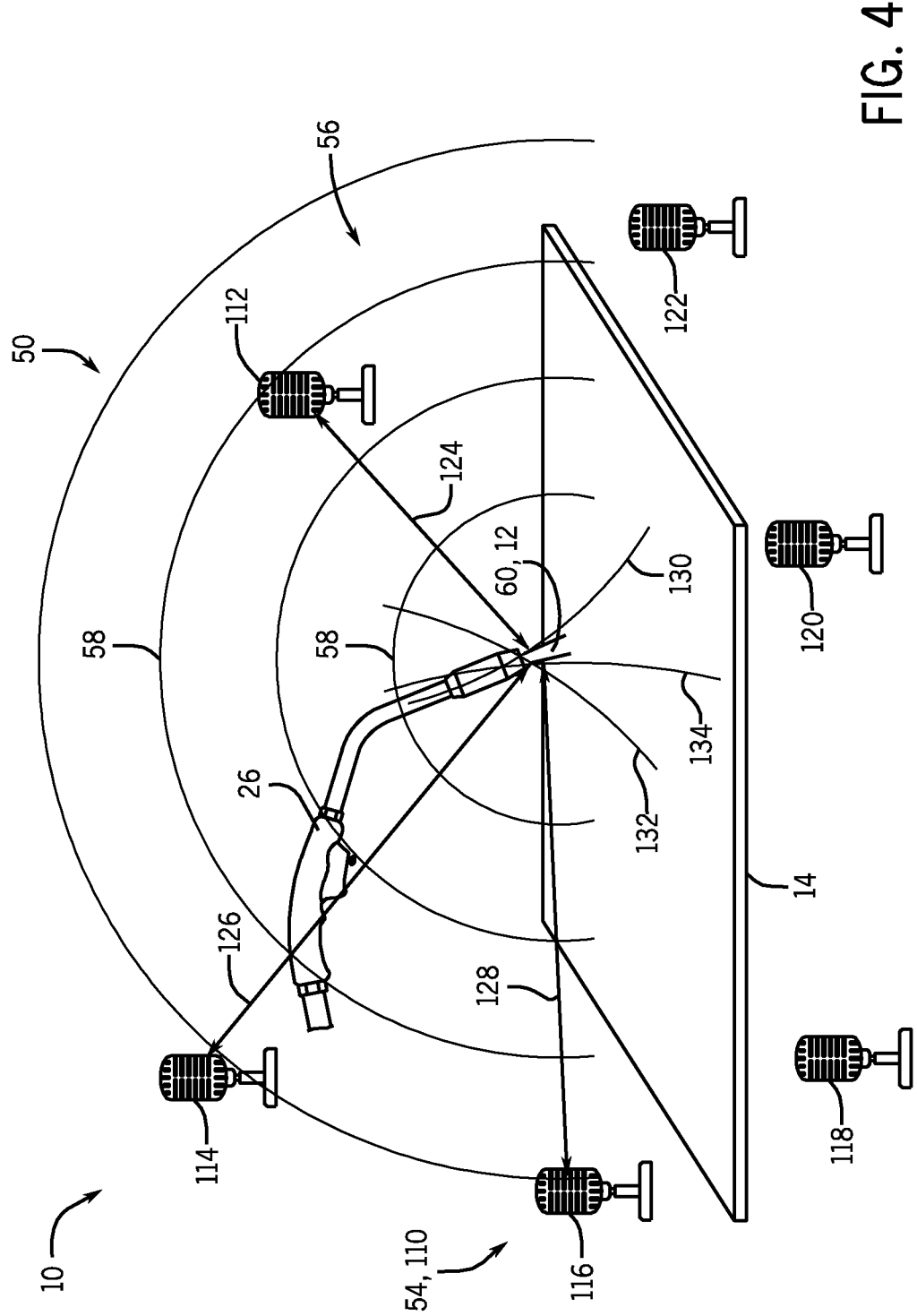
FIG. 4 illustrates an embodiment of the welding system of FIG. 2, including a microphone array for sensing sound emitted from a welding arc.

FIG. 4 illustrates the welding system 10 including components capable of determining a point on the welding torch 26, and thus a travel speed of the welding torch 26, in accordance with one embodiment. In the illustrated embodiment, the one or more sound sensors 54 includes a six element microphone array 110, which includes a first microphone 112, a second microphone 114, a third microphone 116, a fourth microphone 118, a fifth microphone 120, and a sixth microphone 122. The microphone array 110 surrounds the welding area 56, which includes the workpiece 14 (e.g., a metal plate) being welded. The welding torch 26 produces the welding arc 12 between a tip of the welding torch 26 and the current location of the applied weld.

In the illustrated embodiment, the sound 58 comes from a single sound source 60, which is the welding arc 12. As indicated by semicircles, the sound waves 58 are emitted from the welding arc 12 and reach one or more of the microphones in the microphone array 110. The sound 58 arrives at each microphone at a time proportional to a distance between the welding arc 12 and each microphone. For example, the sound 58 arrives at the microphone 112 at a time proportional to a distance 124 between the welding arc 12 and the microphone 112. Similarly, distances 126 and 128 determine the time at which the sound 58 reaches the microphones 114 and 116, respectively. The current sound location of the welding arc 12 may be defined by the region where spherical surfaces 130, 132, and 134 intersect. The spherical surfaces 130, 132, and 134 are associated with the distances 124, 126, and 128 from each of the microphones 112, 114, and 116, respectively. Weld travel speed may be derived from changes in time of the position of the three dimensional sound located welding arc 12.

More specifically, the sound 58 emitted by the welding arc 12 may be detected by the array 110 of microphones with known relative positions. Features of the sound 58 may be used to determine relative timing of sound arrival and therefore distances, or changes in distances, between the welding arc 12 and the array 110 of microphones. In some embodiments, such features of the sound 58 may include natural fluctuations in the welding arc 12, which provide an inherent modulation in the sound 58 emitted from the welding arc 12. For example, the natural fluctuations of the welding arc 12 may emit a unique sound over time, based on fluctuating plasma in the welding arc 12 or spatter output during weld formation. In other embodiments, the sound 58 may be augmented by modulating the weld current over time to create a marker, pulse, or sound pattern that may be more easily identified and whose time of detection may be more precisely determined. Further, in another embodiment, the sound 58 may be augmented by attaching a sound emitting device to the welding torch 26. Indeed, in some embodiments, it may be desirable to have one or more features in the sound signal that enable the determination of when the same feature or features is detected at different nearby sound sensors 54.

In the embodiment illustrated in FIG. 4, the microphone array 110 is placed around the periphery of the weld area 56 to detect the sound 58 emitted from the welding arc 12. The microphones 112, 114, 116, 118, 120, and 122 are used to concurrently measure the sound signal reaching each respective microphone. In certain embodiments, the time between sound emission and reception may be used to determine the approximate distance (e.g., distances 124, 126, or 128) from each microphone to the sound source 60. The distance 124, 126, or 128 defines a radius of a time of flight sphere for each microphone, each time of flight sphere defining a spherical surface upon which the sound source 60 is located. The intersection point of the spherical surfaces (e.g., 130, 132, and 134) from several microphones defines the current location of the sound source 60. In certain embodiments, during operation, the spherical surfaces 130, 132, and 134 may not all intersect at the same location and, therefore, such surfaces may define a region near their intersections (or between near miss intersections), and the sound source 60 may be assumed to be in this location. Accordingly, the average or centroid of this intersection zone may be defined as the current estimate of the location of the point on the welding torch 26 or the welding arc 12. A number of trilateration algorithms exist that could be applied to determine a best estimate location for the current position. In this way, the weld torch position may be estimated over time during a weld operation. The change in position divided by the change in time that elapsed since the last determination of position provides an indication of the three-dimensional weld travel speed of the welding torch 26.

In some embodiments, to facilitate timing of the arrival of a sound feature at each microphone, it may be desirable to have a pulse with fast rise time or other higher frequency components that create an edge, peak, or other rapidly changing inflection feature. The travel speed monitoring device 52 may determine a time of arrival (or time of flight) by analyzing the magnitude, edge, peak, derivative, or other features of the sound pulse/wave. In other embodiments, the travel speed monitoring device 52 may analyze sound phase delays or sound group delays when transmitting the sound in a semi-continuous or full-continuous mode. Alternatively, in another embodiment, a segment of the signal with unique time-based features may be identified for timing analysis using cross correlation techniques on a segment of the signal. Still further, in another embodiment, the signal might be band pass filtered at one or more frequency bands to accentuate or isolate some frequency band prior to timing or cross correlation analysis between the microphone signals. Sound magnitude measurements may be utilized in certain embodiments. This involves determining a position based on a sound pressure level (loudness) of the sound 58 when it hits the one or more sensors 54. The detected sound 58 may have a lower sound pressure level according to the distance it traveled from the sound source 60 to the sound sensor 54. Additionally, in some embodiments, it may be desirable to utilize ultrasonic sound frequencies to create a sound feature. Using an ultrasonic frequency signal for sound timing determination may enable relatively easy processing, via isolation of the high frequency signal, without increasing the audible noise of the welding system 10.

It should be noted that the placement of the microphone array 110 may be subject to a variety of implementation-specific variations. For example, in one embodiment, the individual microphones may be spaced around the weld area 56 and may or may not be located in the same plane. Further, although six microphones are provided in the illustrated embodiment, it should be noted that any suitable number of microphones may be provided in other embodiments. Additionally, instead of positioning a plurality of individual microphones around the welding area, in some embodiments, the microphone array 110 may include a plurality of sub-arrays of microphones positioned about the weld area 56 of interest. In such embodiments, beamforming or holographic methods may be employed to localize the sound. Beamforming methods may involve processing signals from the microphones in each subarray to account for acoustic interference within the sound 58 traveling to the subarray.

In still other embodiments, there may be an additional microphone (not shown) disposed on the welding torch 26, which is not in a fixed relative position to the other microphones of the microphone array 110. This additional microphone may be located near the torch tip, relatively close to the welding arc 12. The travel speed monitoring device 52 may compare a time of arrival of the sound 58 to this microphone with the time of arrival of the sound 58 to each of the fixed microphones. As a result, the position determination of the welding arc 12 may account for the speed of the sound 58 traveling from the welding arc 12 to each microphone.

In certain welding environments, there may be multiple welding systems 10 being utilized in relatively close proximity. In such instances, sounds 58 emitted from one welding system 10 may enter the weld area 56 of an adjacent welding system 10 and be picked up by the sound sensors 54 located about the weld area 56. To keep acoustic interference of the sounds 58 from affecting the travel speed detection, it may be desirable to distinguish the sounds 58 emitted from each different welding system 10 located in a welding environment. This allows the travel speed monitoring device 52 to isolate the sound 58 emitted from the corresponding welding system 10 from other sounds emitted from other systems. To accomplish this, any distinguishing signal emitted from the sound source 60 may be unique to the corresponding welding system 10. For example, it may be desirable to superimpose a distinguishing signal on the welding power from the power supply 16 (e.g., via current modulation). Each power supply 16 may be associated with a distinct signal, thus enabling detection of which signal originated from which power supply 16. In embodiments with a sound emitter located on the welding torch 26, the emitter may output a pattern of chirps or pulses that is unique to the welding torch 26. In still other embodiments, acoustic interference may be overcome by using highly directional microphones to detect the sound 58 emitted from a particular welding system 10. The microphone array 110 may be positioned so that only sounds 58 that hit the microphone from a specific direction are detected. In this way, the sounds 58 from each of the welding systems 10 do not have to be unique, because the directional microphones pick up the sounds emitted directly from their specific weld area 56.

Figure 5:
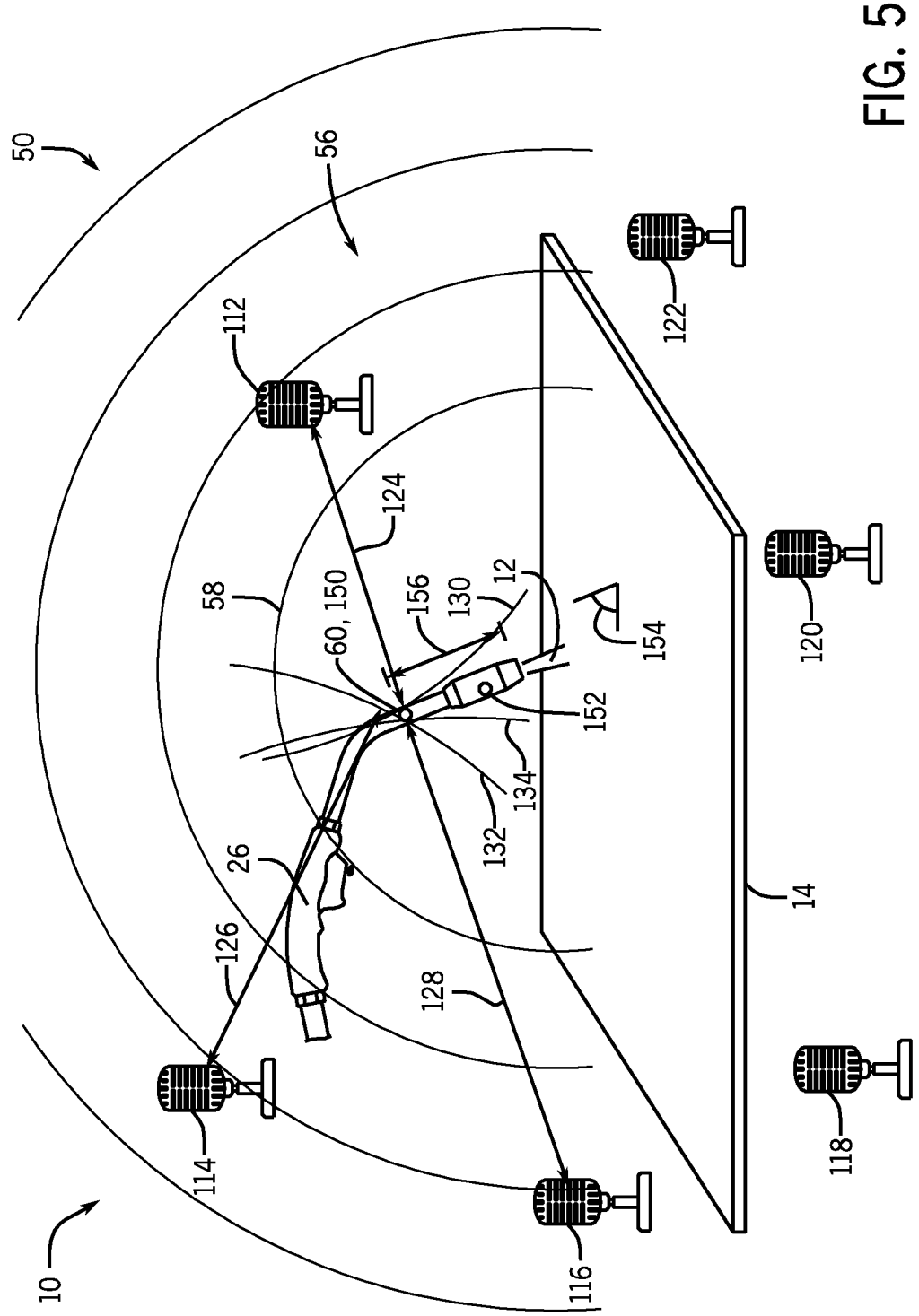
FIG. 5 illustrates an embodiment of the welding system of FIG. 2, including a microphone array for sensing sound emitted from a sound emitting device on the welding torch.

As mentioned above, the sound source 60 that outputs the sound 58 for determining travel speed of the welding torch 26 may include an emitter disposed on the welding torch 26. FIG. 5 illustrates one such embodiment, including the microphone array 110 for sensing the sound 58 emitted from a sound emitting device 150 disposed on the welding torch 26. The sound 58 emitted from the sound emitting device 150 may be distinguishable from the sound emitted from the welding arc 12 produced via the welding torch 26. For example, the sound emitting device 150 may output a pulse, chirp, ultrasonic signal, or another sound that is identifiable with respect to time, so that arrival times of the sound 58 to each of the microphones can be compared. In some embodiments, a single omni-directional sound emitter may be used. However, in other embodiments, multiple sound emitters may be collocated and disposed on the welding torch 26, near a single location. In such embodiments, each emitter may be configured to output sound energy in a directed cone-like pattern. These multiple emitters could be arranged to point in multiple directions and to emit identical sounds at the same instant, providing a more omni-directional sound emission pattern. By using multiple sound emitters, it may be possible to achieve wider directionality in the emitted sound than would be possible with a single directional sound emitter, such that the sound may be easily detected by all elements in the microphone array 110.

It should be noted that in some embodiments, it may be desirable to reduce or eliminate the likelihood of weld travel speed errors due to the sound emitting device 150 being positioned far from the welding arc 12. Accordingly, in the illustrated embodiment, one or more sensors 152 (e.g., triaxial accelerometers, electrolytic tilt sensors, etc.) may be placed on the welding torch 26 to provide the travel speed monitoring device 52 with a current torch angle 154 of the welding torch 26 in the earth's gravitational field. In such an embodiment, measured changes in the torch angle 154 may be detected by these sensors 152, and the travel speed sensing device 52 may determine the position of a point (e.g., tip) on the welding torch 26 based in part on the torch angle 154. In this way, corrections may be made to the weld travel speed based upon the geometry of the sound emitter mounting location (e.g., distance 156) relative to the torch tip and the measured three-dimensional torch angle 154. In some embodiments, multiple sound emitting devices 150 may be disposed at different points on the welding torch 26. The travel speed monitoring device 52 may determine positions of two or more points on the welding torch 26 (where the sound emitting devices 150 are located), based on the detected sound. The travel speed monitoring device 52 may use this position information to determine an orientation of the welding torch 26 with respect to the workpiece 14. In certain contexts. As noted above, the orientation may be utilized for correcting a weld travel speed calculation performed via the travel speed monitoring device 52.

Figure 6:
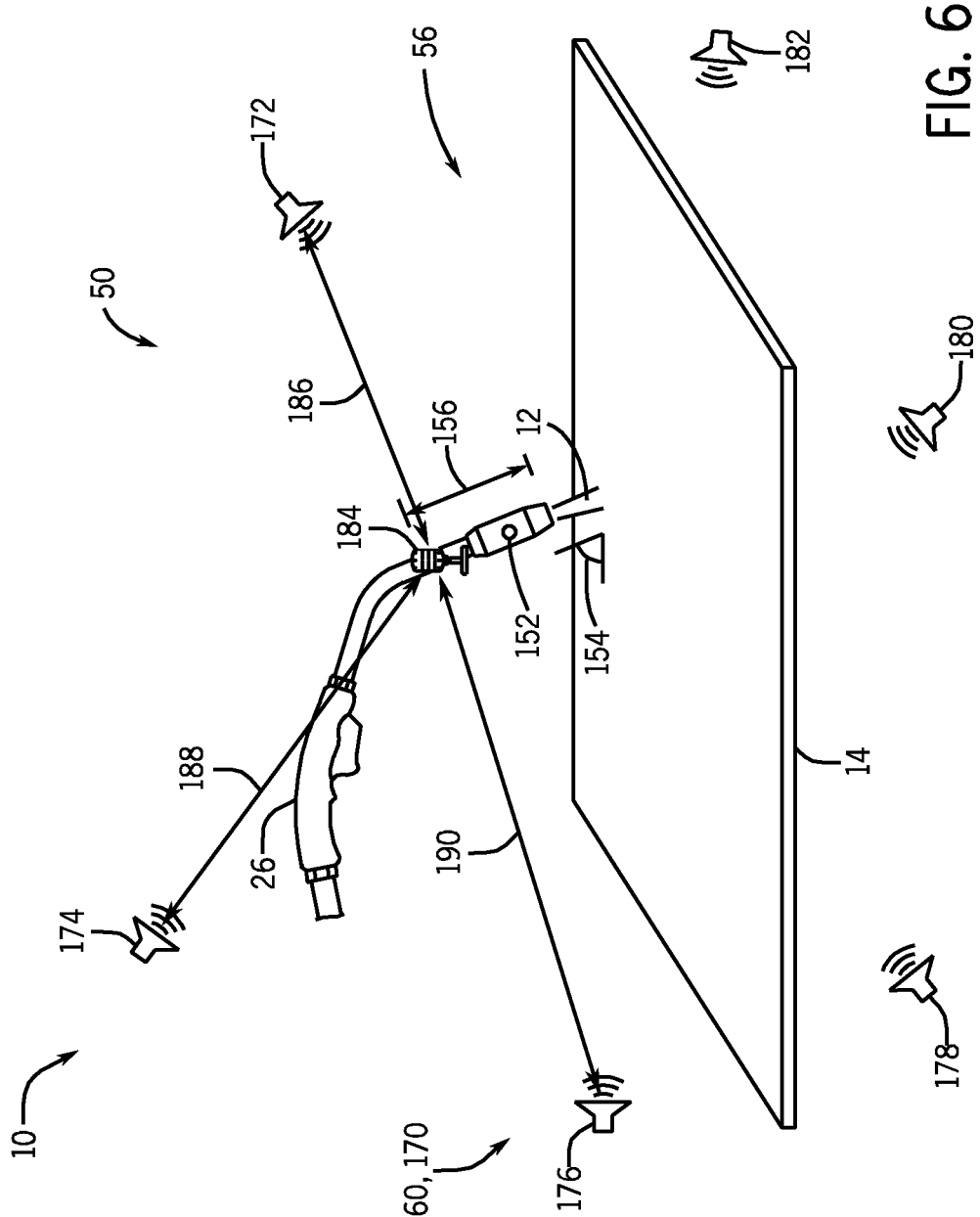
FIG. 6 illustrates an embodiment of the welding system of FIG. 2, including a microphone located on the welding torch for sensing sound emitted from sound emitting devices.

FIG. 6 illustrates another embodiment of the welding system 10 including components capable of determining a position of a point on the welding torch 26, and thus the travel speed of the welding torch 26. As shown, the sound source 60 of the illustrated embodiment is a sound element emitter array 170, which includes emitter elements 172, 174, 176, 178, 180, and 182 whose relative positions are determined. The emitter array 170 is shown surrounding the weld area 56 defined by the workpiece 14 being welded using the welding torch 26. In the illustrated embodiment, an omni-directional (i.e., a random incidence) microphone 184 is mounted to the welding torch 26. Sounds 58 emitted by one or more emitter elements of the emitter array 170 may reach the microphone 184. For example, in the illustrated embodiment, sound 58 emitted by emitter elements 172, 174, and 176 reach the microphone 184. Because the microphone 184 and the sound emitters 172, 174, 176, 178, 180, and 182 may be connected to the same electronics (e.g., travel speed monitoring device 52), the time between sound emission from each emitter and the detection by the microphone 184 may be determined. Further, radial distances 186, 188, and 190 between the microphone 184 and each emitter may be calculated from the time delay. Therefore, the position of the microphone 184, which corresponds to the approximate location of the welding arc 12, may be determined by time of flight trilateration, and the three-dimensional speed of the microphone 184 may be calculated over time to provide an indication of welding torch travel speed during a welding operation.

In the embodiment illustrated in FIG. 6, as compared to FIGS. 4 and 5, the location of the sound source 60 (e.g., emitters, welding arc 12) and sound sensors 54 (e.g., microphones) are reversed. That is, in this embodiment, the sound emitters 172, 174, 176, 178, 180, and 182 are located around the weld area 56, and the one or more microphones 184 are placed at specific points on the welding torch 26 to receive the emitted sounds. In embodiments where a single microphone 184 is located on the welding torch 26, the microphone 184 may provide a signal to the travel speed monitoring device 52 for processing. The travel speed monitoring device 52 may separate the sounds 58 from each of the sound emitters 170 to determine relative times of arrival of the sounds 58 at the microphone 184. In embodiments where multiple sound sensors 54 (e.g., microphones) are disposed at different points on the welding torch 26, the travel speed monitoring device 52 may receive signals from each of the sound sensors 54. The travel speed monitoring device 52 may determine, based on the multiple signals, an orientation of the welding torch 26 in the earth's gravitational field. In certain contexts, the orientation may be utilized for correcting a weld travel speed calculation performed via the travel speed monitoring device 52.

In certain embodiments, it may be desirable for the sound emitters 170 to be distinctly recognizable by the microphone 184. To this end, in some embodiments, each emitter may produce a different waveform in time (frequency/waveform separation). In other embodiments, the sound emitters 170 may produce sequential sounds with an appropriate delay between each sound emission (time separation). Further, a time domain waveform may be encoded by a given frequency content or shape over time, thus enabling the individual pulses to be identified even if they arrive at the microphone 184 superimposed. Additionally, in another embodiment, each emitter may produce a distinctly shaped sound wave, such as a triangle wave, square wave, sine wave, or other shaped wave or pulse, having a varied time, width, or repeated pattern (with unique timing, shapes, frequencies and/or amplitudes) that renders the wave identifiable. Such techniques may be applied across emitters arrays 170 used for different welding systems 10 or in different weld cells that are located in close proximity, to reduce an effect of acoustic interference.

A combination of techniques may be used to identify one or more sounds when unique pulses or pulse/wave patterns are utilized for distinguishing the sounds. These distinguishable sounds may be from different sound emitting devices (as shown in FIG. 6), or they may be from different welding systems altogether (as described with reference to FIG. 4). In an embodiment, the signal received by the sound sensor 54 may be bandpass filtered to isolate the signal from noise. Then, a form of pattern matching may be applied to the signal to identify which of the sounds received by the sound sensor 54 is the one associated with the desired welding torch 26 or sound emitting device. Any number of different pattern matching techniques may be used, including simple template comparisons and convolutions. More complicated pattern matching techniques may include combinations of steps, such as performing feature extractions followed by statistical pattern recognition or neural network pattern matching. These and any other appropriate pattern matching techniques may be implemented via the processor 64 of the travel speed monitoring device 52 to separately identify a desired sound emitted for determination of weld torch position and travel speed.

It should be noted that in some embodiments, it may be desirable to reduce or eliminate the likelihood of weld travel speed errors due to the microphone 184 being positioned far from the welding arc 12. As described in reference to FIG. 5, the one or more sensors 152 (e.g., triaxial accelerometers, tilt sensors) may be placed on the welding torch 26 to provide the travel speed monitoring device 52 with the torch angle 154 in the earth's gravitational field. Corrections may be made to the weld travel speed based upon the geometry of the microphone mounting location (e.g., distance 156) relative to the torch tip and the measured three-dimensional torch angle 154.

In embodiments having electronic components mounted to the welding torch 26, it may be desirable for such components to be appropriate for the welding environment. These components may include, for example, the microphone 184, the sound emitting device 150, and/or the sensors 152. The components may be configured to withstand shock from the welding torch 26 impacting the workpiece 14 or other components in the weld area 56. In addition, the components may be capable of operating without electromagnetic interference and within high temperature environments, such as may be encountered during the welding process.

It may be desirable that the array (e.g., microphone array 110 of FIG. 4, emitter array 170 of FIG. 6) be configured to perform self-calibration of the relative positions of the microphones and/or emitters of the array, since the array defines the coordinate system by which the travel speed is measured. If the array cannot self-calibrate the relative position of each member of the array, then for some embodiments (as described above), the elements of the array may be precisely positioned relative to one another in a known configuration. In other embodiments, the method for self-calibration may involve each array element having both a sound receiver and sound transmitter. These may be the same element, in cases where the technology allows the element to function as both an emitter and receiver of sound pulses, or this may be implemented via a collocated transmitter and receiver at each array position. In either case, one array element can be defined as the origin for a coordinate system. Then the distance between each element of the array and every other element can be calculated by each array element producing a sound, one at a time, at a known instant while all other elements determine the time for the sound to reach them. The time delay of this sound arrival may then be converted to a distance from the sound emitting element and each other array element by multiplying by the speed of sound. With the distance between all points of the array known, it is possible to solve for the position of all array elements relative to the origin element by using trilateration techniques. A coordinate system may also be devised, if desired, using arbitrary elements of the array, where any two elements can define a coordinate system axis and any three elements can define a coordinate system plane. This technique may allow the array elements to be imprecisely placed around the welding area 56 and then the travel speed sensing system 50 can self-determine the array element positions upon demand. With the relative position of all array elements known, the torch position can be accurately determined by trilateration. Accidental or purposeful movement of one or more array elements may be quickly accounted for by this self-calibration technique, so that the travel speed sensing system 50 self-maintains its calibrated weld travel speed measurement.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A weld travel speed sensing system, comprising: at least one sound sensor configured to sense one or more sounds generated to allow determination of a position of a welding torch, wherein the one or more sounds comprises a welding arc sound;
   wherein the weld travel speed sensing system is configured to determine a position of a point on the welding torch based on the one or more sensed sounds;
   wherein the one or more sounds is identifiable by the travel speed sensing system based on a pulse pattern, a chirp, a delay, a waveform, a frequency content, a sound wave shape, or some combination thereof.

2. The weld travel speed sensing system of claim 1, comprising an array of sound sensors disposed about a weld area.

3. The weld travel speed sensing system of claim 1, wherein the at least one sound sensor is disposed on the welding torch.

4. The weld travel speed sensing system of claim 1, wherein the one or more sounds generated to allow determination of the position of the welding torch is emitted from one or more emitters disposed on the welding torch.

5. The weld travel speed sensing system of claim 1, wherein the one or more sounds generated to allow determination of the position of the welding torch is emitted from one or more emitters in an array of emitters disposed about a weld area.

6. The weld travel speed sensing system of claim 1, comprising a sensor disposed on the welding torch, wherein the sensor is configured to sense a parameter indicative of a torch angle of the welding torch, and wherein the travel speed sensing system is configured to determine the position of the point on the welding torch based on the sensed parameter.

7. The weld travel speed sensing system of claim 1, wherein the weld travel speed sensing system is configured to detect the position of the point on the welding torch based on a time of flight of the one or more sounds to the at least one sound sensor.

8. The weld travel speed sensing system of claim 1, wherein the one or more sounds is distinguishable, via the travel speed sensing system, from sounds associated with one or more additional welding systems.

9. The weld travel speed sensing system of claim 1, wherein the one or more sounds is identifiable by the travel speed sensing system based on a pulse pattern, a chirp, a delay, a waveform, a frequency content, a sound wave shape, or some combination thereof.

10. The weld travel speed sensing system of claim 1, comprising an array of sound sensors and/or sound emitters, wherein the travel speed sensing system is configured to self-calibrate a position of each sound sensor and/or sound emitter in the array.

11. The weld travel speed sensing system of claim 1, wherein the weld travel speed sensing system is configured to compare times of arrival of the one or more sounds sensed by the at least one sound sensor to determine the location of the point on the welding torch.

12. The weld travel speed sensing system of claim 1, wherein the weld travel speed sensing system is configured to determine a travel speed of the welding torch by determining a change in the position of the point on the welding torch with respect to time.

13. The weld travel speed sensing system of claim 1, wherein the weld travel speed system is configured to:

determine positions of two or more points on the welding torch based on the one or more sensed sounds; and determine an orientation of the welding torch based on the determined positions.

14. A weld travel speed sensing system, comprising: at least one sound sensor configured to sense a modulated sound emitted from a welding arc produced by a welding torch;

wherein the weld travel speed sensing system is configured to determine a position of the welding arc based on the sensed sound.

15. The weld travel speed sensing system of claim 14, wherein the sound emitted from the welding arc is identifiable based on natural fluctuations in the welding arc.

16. The weld travel speed sensing system of claim 14, wherein the sound emitted from the welding arc is modulated, based on an augmented current flow to the welding torch.

17. The weld travel speed sensing system of claim 14, wherein the weld travel speed sensing system is configured to determine a travel speed of the welding torch by determining a change in position of the welding arc with respect to time.

18. A method, comprising: determining, via a sound sensor associated with a welding system, a sensor signal indicative of one or more modulated sounds emitted for determination of a position of a welding torch of the welding system, wherein the one or more modulated sounds comprises a welding arc sound; and determining, via a processing system, a position of a point on the welding torch based at least in part on the sensor signal.

19. The method of claim 18, comprising:

comparing, via the processing system, times of arrival of the one or more sounds to one or more sound sensors based on sensor signals from the one or more sound sensors;

trilaterating, via the processing system, the position of the point on the welding torch based on the compared times of arrival; and determining the travel speed by detecting a change in the position of the point on the welding torch with respect to time.

20. The method of claim 18, wherein determining the position of the point on the welding torch comprises processing the sensor signal to isolate the one or more sounds emitted from the welding system.

* * * * *